(12) United States Patent
Zhou

(10) Patent No.: US 9,766,394 B2
(45) Date of Patent: Sep. 19, 2017

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 240 days.

(21) Appl. No.: 14/431,014

(22) PCT Filed: Jan. 16, 2015

(86) PCT No.: PCT/CN2015/070893
§ 371 (c)(1),
(2) Date: Mar. 25, 2015

(87) PCT Pub. No.: WO2016/101371
PCT Pub. Date: Jun. 30, 2016

(65) Prior Publication Data
US 2016/0341886 A1    Nov. 24, 2016

(30) Foreign Application Priority Data
Dec. 24, 2014  (CN) .......................... 2014 1 0819627

(51) Int. Cl.
*G02F 1/1335* (2006.01)
*F21V 8/00* (2006.01)
*G02F 1/1333* (2006.01)

(52) U.S. Cl.
CPC ........... *G02B 6/0088* (2013.01); *G02B 6/005* (2013.01); *G02B 6/0055* (2013.01);
(Continued)

(58) Field of Classification Search
CPC .... G02B 6/0088; G02B 6/005; G02B 6/0055; G02F 1/133308
(Continued)

(56) References Cited

U.S. PATENT DOCUMENTS 5,886,759 A * 3/1999 Mashino ................ G01D 11/28
349/113
6,690,435 B1 * 2/2004 Ha ........................ G02B 6/0031
349/58
(Continued)

*Primary Examiner* — Hoan C Nguyen
(74) *Attorney, Agent, or Firm* — Andrew C. Cheng

(57) ABSTRACT

A backlight module includes a backplane, a mold frame, a light guide plate, and an optic film. The optic film includes a first layer and a second layer stacked on the first layer and including a constraint portion including an extension section, a connection section, and a support section parallel with and opposite to the extension section. The connection section connects between the support section and the extension section. The extension section extends from an end of the second layer. The optic film is stacked on the light guide plate with the first layer engaging the light guide plate. The mold frame surrounds the light guide plate and the first layer and is received in the backplane. The connection section is located outside opposite sides of the backplane. The mold frame and the opposite sides of the backplane are received and retained between the support section and the extension section.

13 Claims, 2 Drawing Sheets

(52) U.S. Cl.
CPC .. *G02F 1/133308* (2013.01); *G02F 1/133615* (2013.01); *G02F 2001/133317* (2013.01); *G02F 2001/133322* (2013.01); *G02F 2202/28* (2013.01)

(58) Field of Classification Search
USPC ...................................................... 349/58, 62
See application file for complete search history.

(56) References Cited

U.S. PATENT DOCUMENTS

| | | | |
|---|---|---|---|
| 7,671,936 B2* | 3/2010 | Chang | G02B 6/0068 349/58 |
| 8,816,714 B2* | 8/2014 | Kwon | G02F 1/1309 324/756.01 |
| 2013/0021782 A1* | 1/2013 | Yan | G02F 1/13452 362/97.4 |

* cited by examiner

BACKLIGHT MODULE AND DISPLAY DEVICE

CROSS REFERENCE TO RELATED APPLICATIONS

This application claims the priority of Chinese Patent Application No. 201410819627.X, entitled "Backlight Module and Display Device", filed on Dec. 24, 2014, the disclosure of which is incorporated herein by reference in its entirety.

BACKGROUND OF THE INVENTION

1. Field of the Invention

The present invention relates to the field of liquid crystal displaying technology, and in particular to a backlight module and a display device.

2. The Related Arts

Currently, liquid crystal display devices have been widely used in various electronic products to serve as display components of electronic devices. Bezels of the electronic devices are getting slimmer and slimmer, while brightness is required to be increasingly high and also suits the need for power saving. A backlight module is an important component of the liquid crystal display device and thus, light incidence efficiency of a light bar of the backlight module must suit the need of being increasingly high.

Generally, a backlight module includes a light guide plate, an optic film, a mold frame arranged around the light guide plate, a light source flexible circuit board, and a light-shielding adhesive tape. The optic film is fixed to the mold frame by the light-shielding adhesive tape and a liquid crystal display screen is fixed to a perimeter of the backlight unit by a double-sided adhesive tape. However, since an engagement area between the liquid crystal display screen and the double-sided adhesive tape is large and an engagement area between the optic film and the double-sided adhesive tape is small, when the liquid crystal display screen and the optic film need to be detached in reworking, it may occur that the double-sided adhesive tape may get residual on the panel. Further, the optic film may get easily shifted or damaged by scraping, leading to the backlight unit being ruined and production yield rate being lowered down.

SUMMARY OF THE INVENTION

The technical solution to be addressed in the present invention is to provide a backlight module and a display device, which help ensure the quality of an optic film and increase production yield rate.

To achieve the above object, embodiments of the present invention provide the following technical solutions:

The present invention provides a backlight module, which comprises a backplane, a mold frame, a light guide plate, and an optic film, the optic film comprising a first layer and a second layer stacked on the first layer, the second layer comprising a constraint portion, the constraint portion comprising an extension section, a connection section, and a support section that is arranged parallel with and opposite to the extension section, the connection section connecting between the support section and the extension section, the extension section extending from an end of the second layer, the optic film being stacked on the light guide plate with the first layer engaging the light guide plate, the mold frame surrounding the light guide plate and the first layer of the optic film and being received in the backplane, the connection section being located outside opposite sides of the backplane, the mold frame and the opposite sides of the backplane being received and retained between the support section and the extension section.

In the above backlight module, the backlight module further comprises a double-sided adhesive tape, the double-sided adhesive tape being arranged on an edge portion of the second layer connected to the extension section and the extension section.

In the above backlight module, the backplane comprises a bottom board and side boards arranged at opposite sides of the bottom board, the bottom board and the side boards delimiting a receiving space for receiving therein the mold frame, the light guide plate, and the first layer of the optic film, the mold frame being arranged along the side boards.

In the above backlight module, the extension section of the second layer is positioned against a surface of the side board that is distant from the bottom board, the connection section of the second layer being positioned on an outer side of the side board, the support section being located on an outside surface of the bottom board at an end portion thereof close to the side board and fixed by a double-sided adhesive tape.

In the above backlight module, the backlight module further comprises a reflector plate, the reflector plate being arranged on the bottom board of the backplane and located under the light guide plate.

In the above backlight module, the extension section, the connection section, and the support section of the second layer collectively define a U-shaped configuration.

The present invention also provides a display device, which comprises a liquid crystal panel and a backlight module, the backlight module comprising a backplane, a mold frame, a light guide plate, and an optic film, the optic film comprising a first layer and a second layer stacked on the first layer, the second layer comprising a constraint portion, the constraint portion comprising an extension section, a connection section, and a support section that is arranged parallel with and opposite to the extension section, the connection section connecting between the support section and the extension section, the extension section extending from an end of the second layer, the optic film being stacked on the light guide plate with the first layer engaging the light guide plate, the mold frame surrounding the light guide plate and the first layer of the optic film and being received in the backplane, the connection section being located outside opposite sides of the backplane, the mold frame and the opposite sides of the backplane being received and retained between the support section and the extension section, the extension section being fixed by a double-sided adhesive tape to the liquid crystal panel.

In the above display device, the backplane comprises a bottom board and side boards arranged at opposite sides of the bottom board, the mold frame being mounted on the bottom board and arranged along the side boards.

In the above display device, the extension section of the second layer is positioned against a surface of the side board that is distant from the bottom board, the connection section of the second layer being positioned on an outer side of the side board, the support section being located on an outside surface of the bottom board at an end portion thereof close to the side board and fixed by a double-sided adhesive tape.

In the above display device, the backlight module further comprises a reflector plate, the reflector plate being arranged on the bottom board of the backplane and located under the light guide plate.

In the above display device, the backlight module further comprises a double-sided adhesive tape, the double-sided adhesive tape being arranged on an edge portion of the second layer connected to the extension section and the extension section.

In the above display device, the bottom board and the side boards delimit a receiving space for receiving therein the mold frame, the light guide plate, and the first layer of the optic film.

In the above display device, the extension section, the connection section, and the support section of the second layer collectively define a U-shaped configuration.

The present invention provides an optic film that is additionally provided with a constraint portion to provide an expanded fixing site to a double-sided adhesive tape. A surface area of the double-sided adhesive tape that is in adhesive engagement with a liquid crystal panel is the same as that in adhesive engagement with the optic film so that the bonding strengths with respect to the liquid crystal panel and the backlight module are in balance with each other. During a process of assembling or disassembling, damages of the optic film, such as scraping, resulting from unequal bonding strengths can be prevented and thus the quality of the display device can be improved.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution proposed in an embodiment of the present invention with reference to the attached drawings of the embodiment of the present invention.

Figure 1:
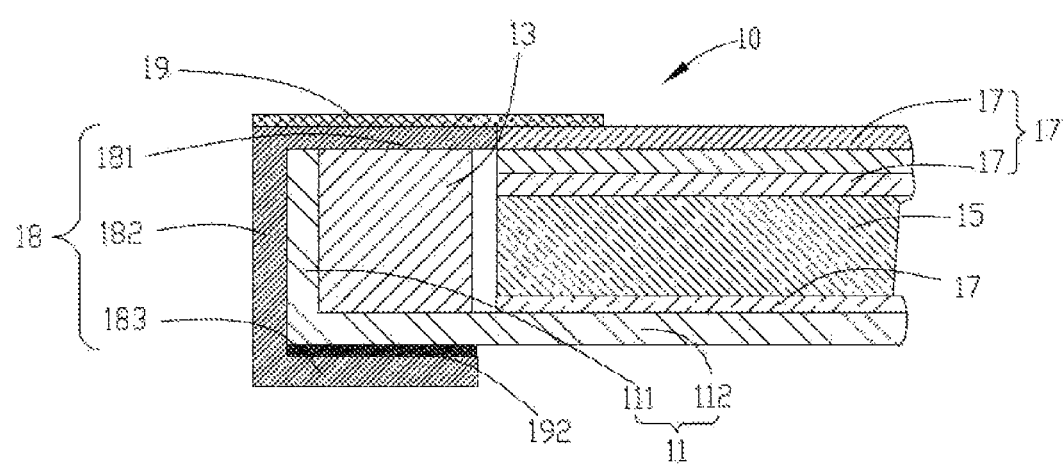
FIG. 1 is a cross-sectional view showing a backlight module according to a preferred embodiment provided by a first aspect of the present invention.

Referring to FIG. 1, the present invention provides a backlight module 10. The backlight module 10 comprises a backplane 11, a mold frame 13, a light guide plate 15, and an optic film 17. The optic film 17 comprises a first layer 171 and a second layer 172 stacked on the first layer 171. The second layer 172 comprises a constraint portion 18. The constraint portion 18 comprises an extension section 181, a connection section 182, and a support section 183 that is arranged parallel with and opposite to the extension section 181. The connection section 182 connects between the support section 183 and the extension section 181. The extension section 181 extends from an end of the second layer 172. The optic film 17 is stacked on the light guide plate 15 with the first layer 171 engaging the light guide plate 15. The mold frame 13 surrounds the light guide plate 15 and the first layer 171 of the optic film 17 and is received in the backplane 11. The connection section 182 is located outside opposite sides of the backplane 11. The mold frame 13 and the opposite sides of the backplane 11 are received and retained between the support section 183 and the extension section 181.

Further, the backlight module 10 further comprises a double-sided adhesive tape 19. The double-sided adhesive tape 19 is arranged on an edge portion of the second layer 172 connected to the extension section 181 and the extension section 181. The optic film 17 according to the present invention comprises an additionally provided constraint portion 18, which an expanded fixing site for the double-sided adhesive tape.

In the instant embodiment, the backplane 11 comprises a bottom board 111 and side boards 112 arranged at opposite sides of the bottom board 111. The bottom board 111 and the side boards 112 delimit a receiving space for receiving therein the mold frame 13, the light guide plate 15, and the first layer 171 of the optic film 17. The light guide plate 15 is in the form of a flat board. The first layer 171 of the optic film 17 is in the form of a plate stacked on a light incidence surface of the light guide plate 15.

Further, the extension section 181 of the second layer 172 is positioned against a surface of the side board 112 that is distant from the bottom board 111. The connection section 182 of the second layer 172 is positioned on an outer side of the side board 112. The support section 183 is located on an outside surface of the bottom board 111 at an end portion thereof close to the side board 112 and is fixed by a double-sided adhesive tape 192. In the instant embodiment, the extension section 181, the connection section 182, and the support section 183 of the second layer collectively define a U-shaped configuration. The opposite sides of backplane 11 that respectively comprise the side boards 112 and the mold frame 13 are inserted into the U-shaped configuration. The support section 183 and the extension section 181 are arranged opposite to so as to better secure stability of assembly among the backplane 11, the mold frame 13, the light guide plate 15, and the optic film 17.

Further, the backlight module 10 further comprises a reflector plate 12. The reflector plate 12 is arranged on the bottom board 111 of the backplane 11 and located under the light guide plate 15.

Figure 2:
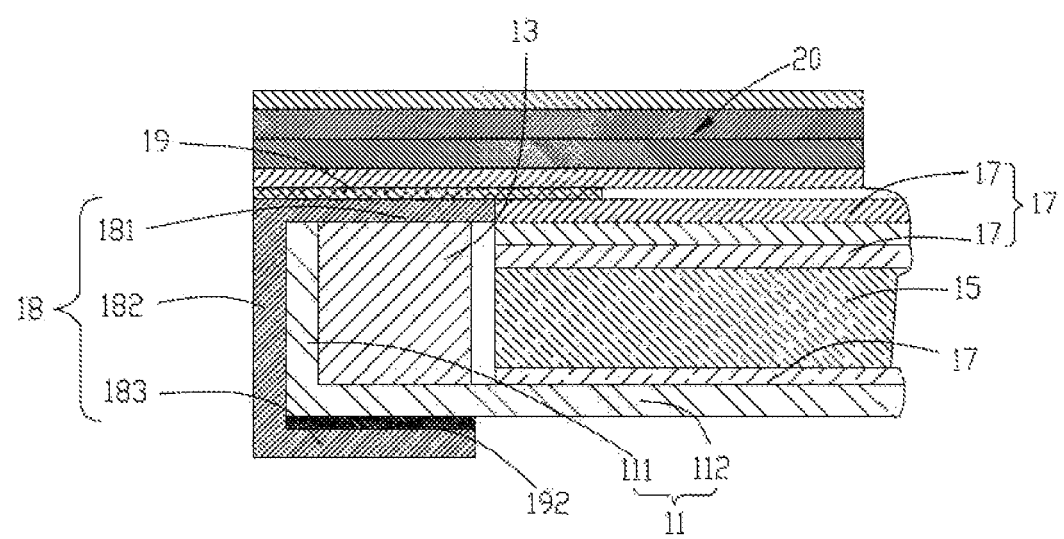
FIG. 2 is a cross-sectional view showing a display device including the backlight module according to a preferred embodiment provided by a third aspect of the present invention.

Referring to FIG. 2, the present invention also provides a display device. The display device comprises a liquid crystal panel 20 and the backlight module 10. The liquid crystal panel 20 is arranged on the optic film 17 of the backlight module 10 and the liquid crystal panel is fixed by a double-sided adhesive tape 19 arranged on the extension section 181. A surface area of the double-sided adhesive tape 19 that is in adhesive engagement with the liquid crystal panel 20 is the same as that in adhesive engagement with the optic film 17 so that the bonding strengths with respect to the liquid crystal panel 20 and the optic film 17 of the backlight module 10 are in balance with each other. Further, the support section 183 provides an additional support force involving the backplane 11. During a process of assembling or disassembling, damages of the optic film, such as falling and scraping, resulting from unequal bonding strengths can be prevented and thus the quality of the display device can be improved.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A backlight module, comprising a backplane, a mold frame, a light guide plate, and an optic film, wherein the optic film comprises a first layer and a second layer stacked on the first layer, the second layer comprising a constraint portion, the constraint portion comprising an extension section, a connection section, and a support section that is arranged parallel with and opposite to the extension section, the connection section connecting between the support section and the extension section, the extension section extending from an end of the second layer, the optic film being stacked on the light guide plate with the first layer in surface engagement with the light guide plate, the mold frame surrounding the light guide plate and the first layer of the optic film and being received in the backplane, the connection section being located outside opposite sides of the backplane, the mold frame and the opposite sides of the backplane being received and retained between the support section and the extension section;

wherein a top end surface of the backplane and a top surface of the mold frame are substantially flush with the first layer of the optic film that is in surface engagement with the light guide plate such that the extension section of the constraint portion of the second layer forms a continuous, substantially flat surface on which a double-side adhesive tape is mounted to provide a flat upper surface adapted to support a liquid crystal panel thereon and the extension section is connected by the double-sided adhesive tape to the liquid crystal panel.

2. The backlight module as claimed in claim 1, wherein the double-sided adhesive tape is arranged on an edge portion of the second layer connected to the extension section and the extension section of the constraint portion of the second layer.

3. The backlight module as claimed in claim 2, wherein the backplane comprises a bottom board and side boards arranged at opposite sides of the bottom board, the bottom board and the side boards delimiting a receiving space for receiving therein the mold frame, the light guide plate, and the first layer of the optic film, the mold frame being arranged along the side boards.

4. The backlight module as claimed in claim 3, wherein the extension section of the second layer is positioned against a surface of the side board that is distant from the bottom board, the connection section of the second layer being positioned on an outer side of the side board, the support section being located on an outside surface of the bottom board at an end portion thereof close to the side board and fixed by a double-sided adhesive tape.

5. The backlight module as claimed in claim 3, wherein the backlight module further comprises a reflector plate, the reflector plate being arranged on the bottom board of the backplane and located under the light guide plate.

6. The backlight module as claimed in claim 1, wherein the extension section, the connection section, and the support section of the second layer collectively define a U-shaped configuration.

7. A display device, comprising a liquid crystal panel and a backlight module, the backlight module comprising a backplane, a mold frame, a light guide plate, and an optic film, wherein the optic film comprises a first layer and a second layer stacked on the first layer, the second layer comprising a constraint portion, the constraint portion comprising an extension section, a connection section, and a support section that is arranged parallel with and opposite to the extension section, the connection section connecting between the support section and the extension section, the extension section extending from an end of the second layer, the optic film being stacked on the light guide plate with the first layer in surface engagement with the light guide plate, the mold frame surrounding the light guide plate and the first layer of the optic film and being received in the backplane, the connection section being located outside opposite sides of the backplane, the mold frame and the opposite sides of the backplane being received and retained between the support section and the extension section, wherein a top end surface of the backplane and a top surface of the mold frame are substantially flush with the first layer of the optic film that is in surface engagement with the light guide plate such that the extension section of the constraint portion of the second layer forms a continuous, substantially flat surface on which a double-side adhesive tape is mounted to provide a flat upper surface to support the liquid crystal panel thereon and the extension section is connected by the double-sided adhesive tape to the liquid crystal panel.

8. The display device as claimed in claim 7, wherein the backplane comprises a bottom board and side boards arranged at opposite sides of the bottom board, the mold frame being mounted on the bottom board and arranged along the side boards.

9. The display device as claimed in claim 8, wherein the extension section of the second layer is positioned against a surface of the side board that is distant from the bottom board, the connection section of the second layer being positioned on an outer side of the side board, the support section being located on an outside surface of the bottom board at an end portion thereof close to the side board and fixed by a double-sided adhesive tape.

10. The display device as claimed in claim 7, wherein the backlight module further comprises a reflector plate, the reflector plate being arranged on the bottom board of the backplane and located under the light guide plate.

11. The display device as claimed in claim 7, wherein the double-sided adhesive tape is arranged on an edge portion of the second layer connected to the extension section and the extension section of the constraint portion of the second layer.

12. The display device as claimed in claim 8, wherein the bottom board and the side boards delimit a receiving space for receiving therein the mold frame, the light guide plate, and the first layer of the optic film.

13. The display device as claimed in claim 7, wherein the extension section, the connection section, and the support section of the second layer collectively define a U-shaped configuration.

* * * * *